Oct. 9, 1934.　　　　H. WALTERS　　　　1,976,154
GROUND CONTACT FOR VEHICLES

Filed Oct. 6, 1933

INVENTOR.
Herbert Walters.
BY
Gerald F. Baldwin
ATTORNEY.

Patented Oct. 9, 1934

1,976,154

UNITED STATES PATENT OFFICE 1,976,154

GROUND CONTACT FOR VEHICLES

Herbert Walters, Detroit, Mich.

Application October 6, 1933, Serial No. 692,437

11 Claims. (Cl. 175—264)

This invention relates to improvements in ground contacts for vehicles, and refers more particularly to ground contacts to be employed on such vehicles as gasoline trucks.

It is an object of the invention to provide a ground contact for vehicles which is electrically connected to the latter and so mounted that a portion thereof made of electric conducting material is at all times in contact with the ground.

Another object of the invention is to provide a ground contact for vehicles consisting of a resilient annular member housed between dual wheels of a vehicle and having its periphery made of electric conducting material which is electrically connected to the said vehicle so that a portion of the said periphery is always maintained in contact with the ground by the resilience of the said member irrespective of the degree of inflation of either or both of the tires upon the dual wheels.

A further object of the invention is to provide a ground contact for vehicles which is very durable, efficient in operation, and relatively cheap to manufacture.

With these and other objects and advantages in view which will become apparent as the specification proceeds, the invention is hereinafter more fully described with the aid of the accompanying drawing, in which.

Figure 1:
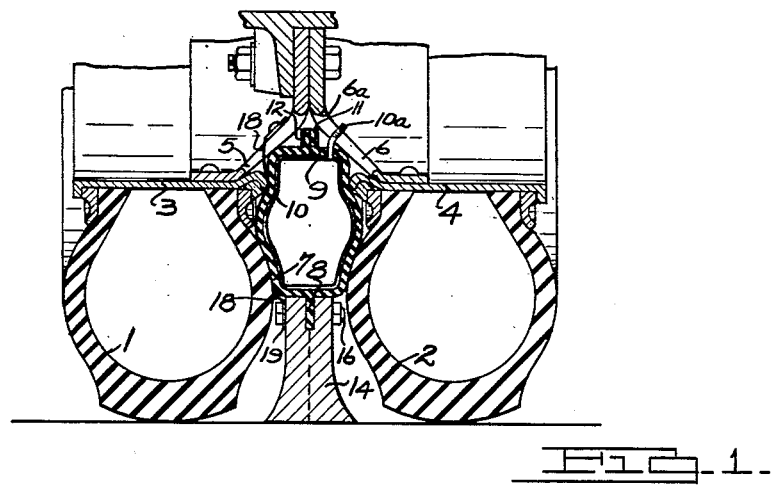
Figure 1 illustrates a sectional view of dual wheels showing the invention, also in section, mounted between them.
Figure 2:
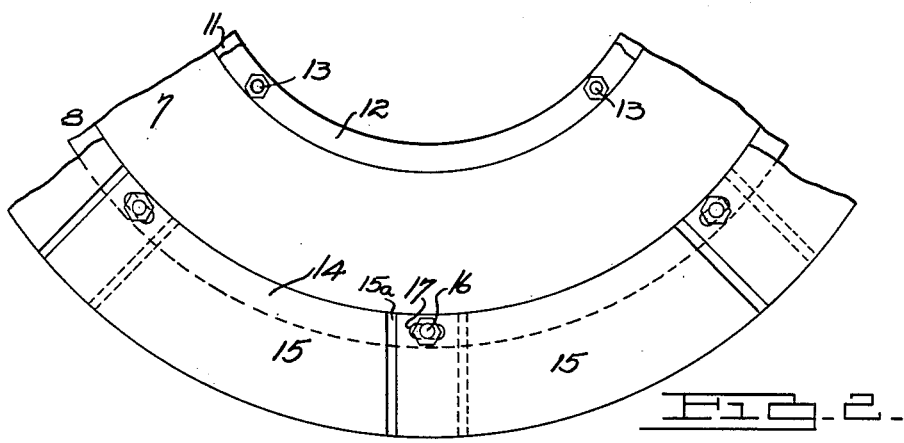
Figure 2 is a partial side view of the invention.
Figure 3:
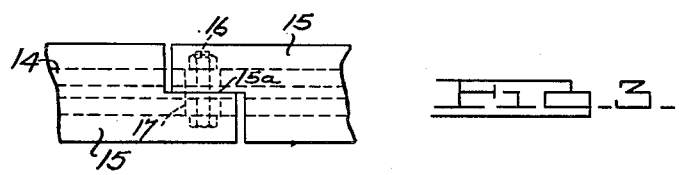
Figure 3 shows a portion of the periphery of the invention.

Referring to the drawing, 1 and 2 designate portions of two ordinary tires which are coaxially arranged and are mounted upon rims 3 and 4 respectively. The rims 3 and 4 are supported by annular spiders 5 and 6 respectively. The sides of these spiders are inwardly inclined towards one another and their inner annular portions rest against one another and are suitably held together. The above described construction is one commonly employed in the manufacture and arrangement of dual wheels and is shown in connection with the invention since the majority of heavy trucks now employed for hauling gasoline and the like are to-day equipped at the rear with dual rather than single wheels.

The ground contact consists in part of an annular casing 7 made of rubber or other resilient material. This casing is closed around its outer face which is provided with an outwardly projecting tongue 8; the inner face of the casing is radially split throughout its circumference as shown at 9 for the introduction of an annular pneumatic tube 10. 10a denotes a conventional air valve which extends from the tube 10 through the casing 7 and extends through an aperture 6a formed primarily for other reasons not connected with the present invention in the spider 6.

Around the inner radially split portion 9 of the casing 7 and formed integral with the latter are opposed inwardly projecting flanges 11 against the outer faces of which rings 12 are arranged. Extending transversely through the rings 12 and flanges 11 are a plurality of bolts 13 by which the said flanges are held together.

14 denotes the peripheral portion of the invention and consists of a plurality of segments 15 made of electric conducting material. Throughout their length the inner faces of these segments are radially grooved to receive a portion of the casing tongue 8, and for a short distance from both extremities of each segment the latter are laterally stepped so that the extremities of adjacent segments may be arranged in overlapping relation as shown at 15a. Extending through each overlapping pair of stepped segment extremities and through the tongue 8 is a bolt 16. In order to permit movement of the segments relative to one another as the casing 7 expands or contracts the openings 17 formed through the segments 15 for the passage of the bolts 16 are elongated.

A suitable lead 18 is bolted, or otherwise suitably secured to the spider 5 so as to make an electrical connection therewith. This lead 18 is also arranged so as to make contact with one of the segments 15, and is in the present instance held against one of the segments by one of the bolts 16. 19 denotes a washer around a bolt 16 to which one extremity of the lead 18 is secured.

From the foregoing it will be clearly seen that the casing 7 is held between the inwardly converging sides of the annular spiders 5 and 6 by which the dual wheels, consisting of the rims 3 and 4 and the tires 1 and 2, are supported. Moreover this arrangement insures the concentric support of the said casing around the dual wheel axis. The inflation of the tube 10 in the casing 7 insures a maintenance of ground contact by the peripheral portion 14 irrespective of the degree of inflation of the tires 1 and 2, and the mounting of the peripheral portion upon the pneumatic casing protects the segments 15 against excessive wear. The arrangement of the casing and tube is also such that they are subjected to only a relatively slight amount of wear.

While in the foregoing the preferred embodiment of the invention has been described and shown, it is understood that many alterations and modifications may be made thereto without departing from the spirit of the invention as expressed in the appended claims.

What I claim as my invention and desire to secure by Letters Patent is:

1. A device of the character described comprising a resilient casing adapted to be mounted upon a vehicle, a peripheral portion made of electric conducting material mounted around said casing adapted to rotate upon the ground as the vehicle travels, and means adapted to connect the peripheral portion electrically to said vehicle.

2. A device of the character described comprising a resilient annular casing adapted to be rotatably mounted upon a vehicle, a peripheral portion of electric conducting material mounted around said casing adapted to rotate upon the ground as the vehicle travels, and means adapted to connect the peripheral portion electrically to said vehicle.

3. A device of the character described comprising a pneumatic annular casing adapted to be rotatably mounted upon a vehicle, a peripheral portion of electric conducting material mounted around said casing adapted to rotate upon the ground as the vehicle travels, and means adapted to connect the peripheral portion electrically to said vehicle.

4. A device of the character described comprising a resilient annular casing adapted to be mounted upon a vehicle, a plurality of overlapping segments made of electric conducting material projecting outwardly from said casing, at least one of these segments contacting the ground at all times as the vehicle travels and means adapted to connect said segments electrically to said vehicle.

5. A device of the character described comprising an annular pneumatic casing adapted to be mounted upon a vehicle, a plurality of overlapping segments of electric conducting material around said casing adapted to rotate upon the ground as the vehicle travels, and means adapted to connect said segments electrically to said vehicle.

6. A device of the character described comprising a resilient annular casing adapted to be mounted upon a vehicle, a circular tongue extending outwardly from the casing periphery, a plurality of segments of electric conducting material grooved to receive portions of said tongue and projecting outwardly from said casing, at least one of the segments contacting the ground at all times as the vehicle travels and means adapted to connect said segments electrically to said vehicle.

7. A device of the character described comprising a pneumatic annular casing closed around its periphery and radially split around its inner circumference, a pneumatic tube in said casing, the latter being adapted to be mounted upon a vehicle, a peripheral portion of electric conducting material mounted around said casing and rotating upon the ground as the vehicle travels, and means adapted to connect said peripheral portion electrically to said vehicle.

8. A device of the character described comprising a pneumatic annular casing closed around its periphery and radially split around its inner circumference, inwardly projecting circular flanges on both sides of the split portion, means holding said flanges contiguous to one another, said casing being adapted to be rotatably mounted upon a vehicle, a pneumatic tube within said casing, a peripheral portion of electric conducting material extending around said casing and projecting outwardly therefrom said peripheral portion rotating upon the ground as the vehicle travels, and means adapted to connect said peripheral portion electrically to said vehicle.

9. A device of the character comprising a pneumatic casing, said casing being adapted to be rotatably mounted upon a vehicle, a peripheral portion of electric conducting material mounted upon and projecting outwardly from said casing, said portion being adapted to rotate upon the ground as the vehicle travels, and a lead connected to said peripheral portion adapted to be also connected to said vehicle.

10. In an arrangement of the character described, the combination of dual wheels adapted to be mounted beneath a vehicle, annular spiders supporting said wheels and lying adjacent one another, an annular flexible casing supported between said spiders, peripheral portions of electric conducting material projecting outwardly around said casing and adapted to rotate upon the ground as the vehicle travels, and means adapted to connect said peripheral portion electrically to said vehicle.

11. In an arrangement of the character described, the combination of dual wheels adapted to be mounted beneath a vehicle, annular spiders supporting said wheels and lying adjacent one another, an annular pneumatic casing supported between said spiders, a pneumatic tube within said casing, overlapping segments of electric conducting material mounted around said casing and projecting outwardly therefrom, said segments each in turn contacting the ground as the wheels and casing turn, and means connected to one of said segments for electrically connecting the latter with said vehicle.

HERBERT WALTERS.